United States Patent [19]

Barton

[11] 4,146,894
[45] Mar. 27, 1979

[54] DOPPLER NAVIGATION SYSTEM WITH ENHANCED MULTI-PATH DISCRIMINATION CAPABILITY

[75] Inventor: Paul Barton, Stortford, England

[73] Assignee: International Standard Electric Corporation, New York, N.Y.

[21] Appl. No.: 848,384

[22] Filed: Nov. 4, 1977

[30] Foreign Application Priority Data

Nov. 10, 1976 [GB] United Kingdom ............... 46847/76

[51] Int. Cl.² .............................................. G01S 5/02
[52] U.S. Cl. ......................... 343/113 DE; 343/106 D
[58] Field of Search ........ 343/106 D, 113 DE, 108 M

[56] References Cited
U.S. PATENT DOCUMENTS

3,946,386  3/1976  Overbury et al. ............... 343/106 D

Primary Examiner—Theodore M. Blum
Attorney, Agent, or Firm—William T. O'Neil

[57] ABSTRACT

A radio navigation system of the simulated Doppler type, including a ground beacon having a multi-element linear antenna array, the elements of which are energized discretely and, in turn, to provide digitized scanning. A remote receiver, in an aircraft on landing approach, for example, derives a beat signal relating to a navigational angle. The remote receiver has a bandpass filter covering the range of Doppler beat frequencies of directly received signals and also detects the start of each ground beacon commutation cycle. A unique combination of inhibiting circuits for eliminating filter transients during at least part of its transient response time and filter cut-off characteristics affords discrimination between direct and multi-path signals when the angular separation of the paths of those signals is at a minimum.

6 Claims, 12 Drawing Figures

DOPPLER NAVIGATION SYSTEM WITH ENHANCED MULTI-PATH DISCRIMINATION CAPABILITY

BACKGROUND OF THE INVENTION

1. Field of the Invention

This invention relates to radio navigation receiver apparatus for use in a simulated Doppler radio navigation system.

2. Description of the Prior Art

Briefly, a (simulated) Doppler radio navigation system (Doppler Microwave Landing System) is one in which there is a ground beacon transmission format involving (a) commutation of a first radio frequency discretely and, in turn, to a linear array of antenna elements, the array being typically of 60λ electrical length, so as to simulate constant velocity unidirectional or bidirectional scanning of the array, whereby a main bearing signal is transmitted which, as "seen" by a remote receiver of the system, undergoes a Doppler frequency shift proportional to the sine of the angle subtended by the receiver normal to the axis of the array; and (b) simultaneous transmission of a reference signal of a second radio frequency (offset from the first), whereby the remote receiver is able to derive a Doppler beat waveform having a frequency indicative of a navigational angle. A basic system of the type is described in U.S. Pat. Nos. 3,626,419 and 3,670,337.

A feature of the above-described transmission format is that, in an elevation guidance system wherein the commutated array is vertical, the direct path signal as received by a remote radio receiver of the system may, in principle, be distinguished from a multipath signal; i.e., a signal which has been reflected from the ground, for example, because the Doppler frequency shift imparted to the direct path signal is of the opposite sense, vis-a-vis that imparted to the ground reflected signal. Accordingly, the receiver fundamentally needs to include a wideband Doppler information filter having a passband covering the range of anticipated Doppler beat frequencies of the direct path signal, with the multipath signals lying in the stop band outside the passband of the filter. Typical beat frequencies for a Doppler elevation system corresponding to direct path signals are 14.88 KHz at 0° elevation down to 8.22 KHz at 10° elevation. The ground multipath signal may be typically between 14.88 KHz (0°) and 21.54 KHz (−10°). The (desired) information filter therefore would have a passband of 8.2 to 14.8 KHz.

Figure 1:
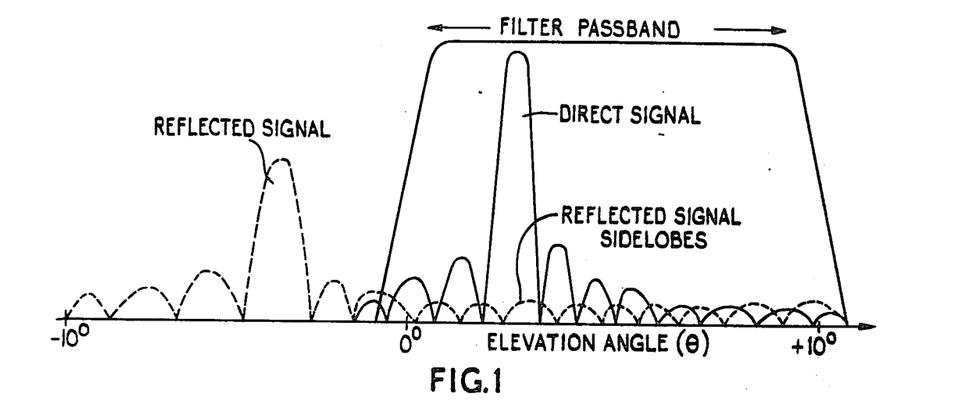
FIG. 1 is a signal spectrum diagram relating to the prior art situation.

However, the side-lobes of the reflected signals spread throughout the passband of the information filter, as will be seen in FIG. 1 of the accompanying drawings, and produce significant error in bearing indication for flight paths over the whole sector when a zero crossing detector and counter are used to register the total number of counts occurring over a complete digitization period. (This is described in British Pat. No. 1,234,541.)

A further error occurs, namely that due to frequency pulling the beat signal towards the center frequency of the filter. This characteristic is well known and is referred to as filter truncation. These two effects are essentially independent of one another but combine linearly.

In order to reduce the aforementioned two errors, the apparatus described in U.S. Pat. No. 3,946,386 provides a radio navigation receiver for use in a Doppler radio navigation system having a transmission format with digitized scanning as hereinbefore defined, said receiver including first means for deriving a Doppler beat information signal from the received signals and including a wideband Doppler information signal filter having a bassband covering the range of anticipated Doppler beat frequencies of the direct path signal, second means for determining the time at which each scan is commenced, third means synchronized by said second means for determining the frequency of said Doppler signal during each said scan, and fourth means under control of said second means for inhibiting operation of said third means at each said scan commencement for at least part of the transient response time of the filter.

Figures 2A, 2B:
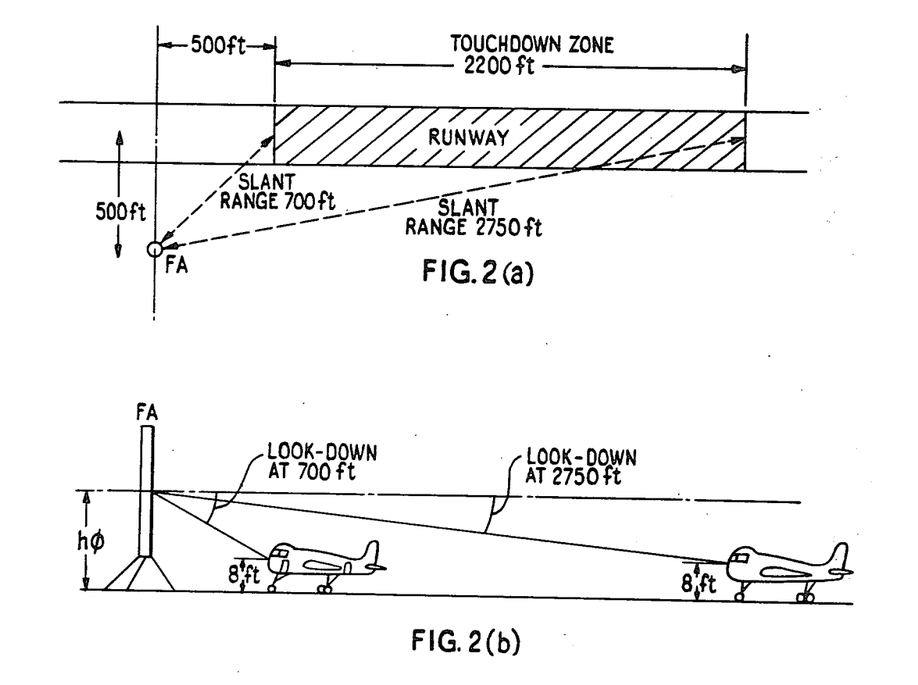
FIGS. 2(a) and 2(b) are geometric diagrams of aircraft angles to the elevation antenna effective phase center.

However, such a receiver works best when operating at elevations above the horizontal; i.e., at heights above the phase center of the transmitting antenna aperture which, in the case of a microwave landing system operating at C-band, may be not less than approximately 17-18 feet. Current requirements dictate that accurate guidance (i.e., with less than 2 ft. error) be achieved over a 2200 ft. touchdown range with a receiving antenna height on the aircraft as low as 8 ft. above the runway, resulting in a so-called "look down" elevation angle. FIGS. 2a and 2b of the accompanying drawings illustrate, respectively, plan and side views of the placement of the elevation ("flare") antenna FA relative to a runway. The relevant requirements for a typical placement are:

| | | |
|---|---|---|
| Slant range from antenna | 2750 ft. | 700 ft. |
| Multipath separation angle | 0.33° | 1.31° |
| Angular accuracy required | 0.042° | 0.164° |
| Look down angle | $\tan^{-1} \frac{h\phi - 8}{2750}$ | $\tan^{-1} \frac{h\phi - 8}{700}$ | where $h\phi$ = ht of antenna phase center.

Consider, for example, the requirements for a receiver sector filter suitable for a 144λ system. A 144λ antenna has an equivalent beamwidth of 57.3/144 = 0.4 degrees. Additionally, in the case of a C-band system where λ = 0.2 ft., the phase center of the antenna will be 17.4 ft. above the ground (allowing 3 ft. clearance under the antenna for snow). The angular requirements in terms of antenna beamwidth (bw) for such an antenna are:

| | | |
|---|---|---|
| Slant range from antenna | 2750 ft. | 700 ft |
| Multipath separation angle | 0.83 bw | 3.275 bw |
| Required accuracy | 0.105 bw | 0.41 bw |
| Look down angle | 0.490 bw | 1.92 bw |

In order that the worst case error at 0.85 bw separation is less or equal to 0.105 bw (required at 2750 ft. range) the ground reflection must be effectively reduced to −12dB with respect to the direct signal. This results from theory relating to accuracy of narrow band tracking devices used in the Doppler system for finally measuring the signal position.

The ground reflection coefficient to be encountered at low angles will be as relatively strong (compared to the direct signal) perhaps as much as −1 dB. Thus, the net attenuation to be obtained is 11 dB. The use of a gated sector filter can provide such an attenuation, but the attenuation value obtained must be considered in conjunction with the "aperture shortening" effect of the gate. In such a case, the gating-in duration will be about 85% of the total scan time, and this increases errors by about 1.5 dB. So the filter cut-off must achieve 12.5 dB attenuation within 0.85 bw frequency shift.

SUMMARY

According to the present invention, there is provided a radio navigation receiver for use in a Doppler radio navigation system having a transmission format with digitized scanning as hereinbefore defined, said receiver including first means for deriving a Doppler beat information signal from the received signals and including a wideband Doppler information signal filter having a passband covering the range of Doppler beat frequencies of the direct path signal, second means for determining the time of commencement of each scan cycle, third means for determining the frequency of said Doppler signal during each said scan, and fourth means under control of said second means at each said scan commencement for at least part of the transient response time of the filter, which filter has a cut-off sufficient to discriminate between the direct signal and the multipath signal when the angular separation of these signals is at a minimum.

As in the receiver disclosed in U.S. Pat. No. 3,946,386, the third means can be inhibited by the fourth means for up to 25% of the scan time, preferably for only 15% of the scan time.

In the preferred embodiment of the invention, the stop-band rejection of the filter is limited to an attenuation equal to that of the multipath signal at said minimum angular separation.

DESCRIPTION OF THE PREFERRED EMBODIMENTS

Figure 3:
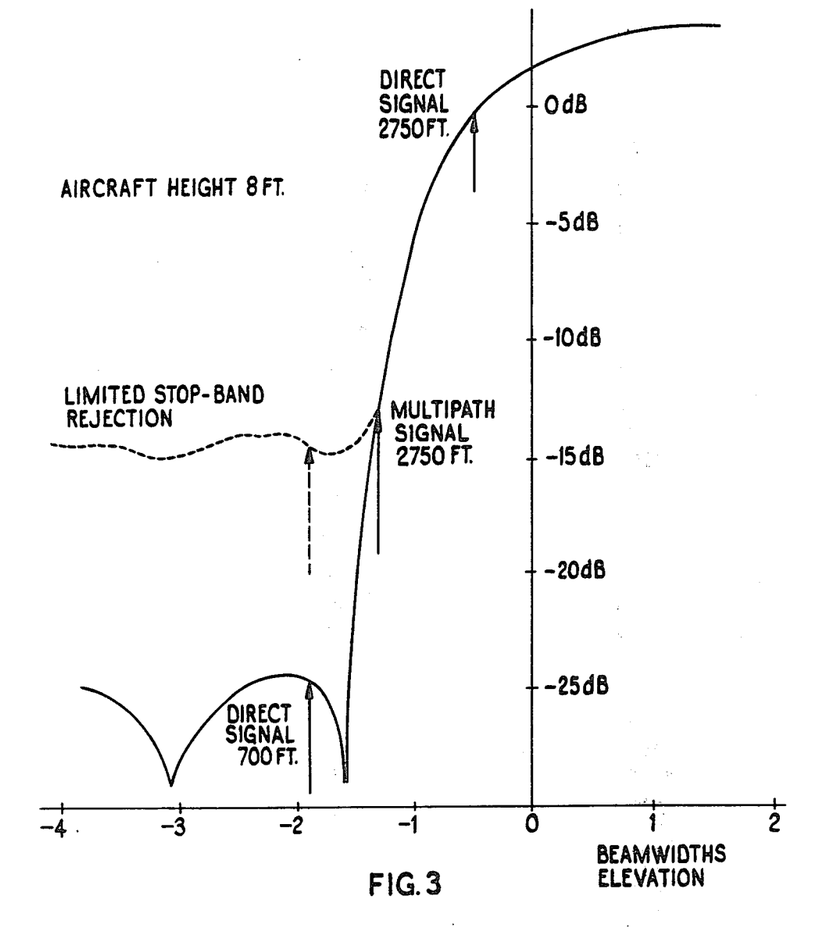
FIG. 3 illustrates the filter characteristics required for a 144λ antenna system.

Referring now to FIG. 3, the filter requirements argued above for C-band operation with a 144λ antenna system are graphically shown. It will be noted that for the look-down situation, see FIG. 2(b), at the far end of the runway, i.e. 2750 feet from the antenna, the multipath signal position is offset from the direct signal position by about 0.85 beamwidths and, if the level of the direct signal is considered to be at 0dB, the steepness of the filter of the cut-off required to provide 12.5 dB discrimination is shown by the solid line. If now the near end condition is considered, i.e. at 700 ft. from the antenna, it will be seen that a filter with a larg ultimate stop-band rejection will be some 25 dB down, the direct signal now being nearly 2 beamwidths displaced from the zero elevation position with respect to the antenna phase center. At this distance, the multipath signal is now so far removed from the direct signal in terms of beamwidth that is not shown in FIG. 3. Therefore, if the stop-band rejection can be limited to the −12.5 dB level, the tracking ability of the filter as it approaches the 700 ft. region will be greatly enhanced.

Figure 4A:
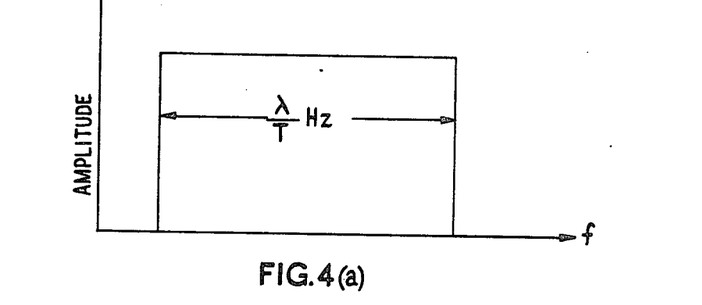
FIGS. 4(a) and 4(b) illustrate the performance characteristics of a classical transversal or delay line filter.
Figure 4B:
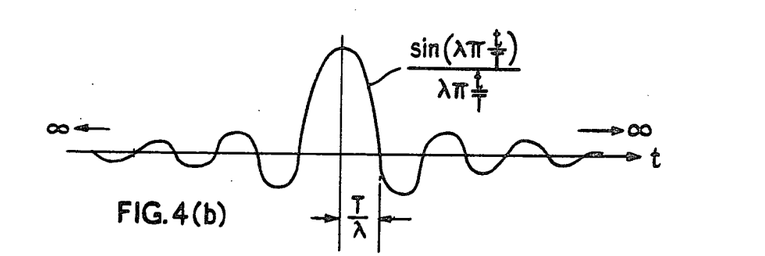
Figure 4C:
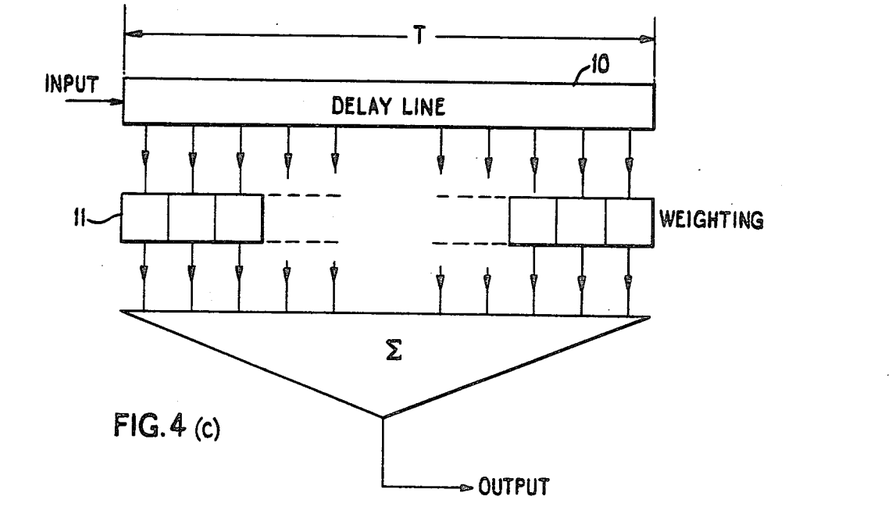
FIG. 4(c) illustrates a block diagram of a filter having the characteristics of FIGS. 4(a) and 4(b).
Figure 4D:
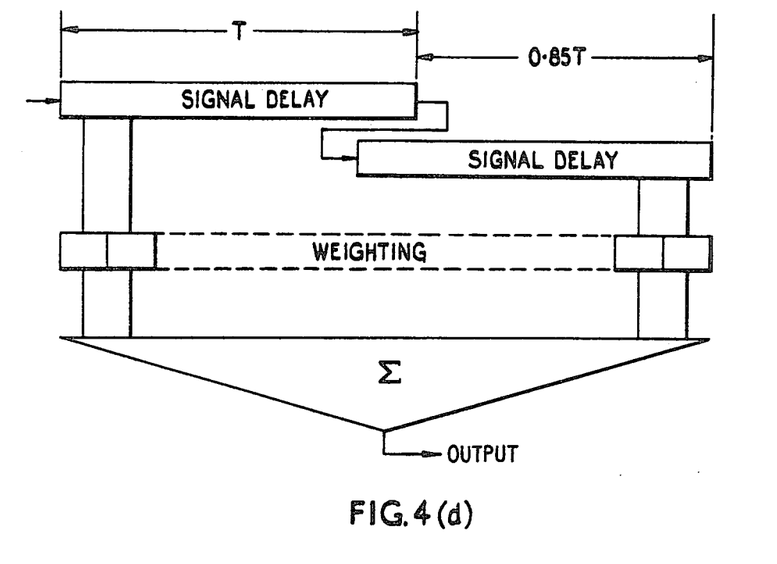
FIG. 4(d) is a block diagram of an extended delay filter of characteristics otherwise comparable to FIG. 4(c).
Figure 5:
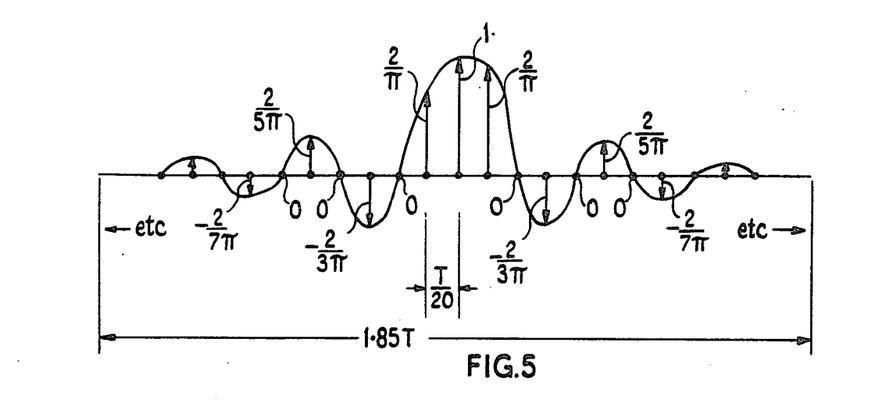
FIG. 5 illustrates the tapping configuration for a transversal filter having the desired cut-off characteristics according to the invention.
Figure 6:
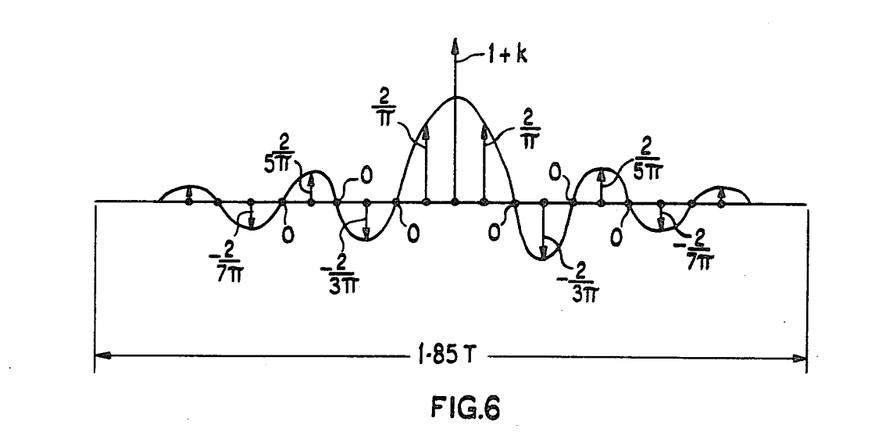
FIG. 6 illustrates a preferred tapping configuration for a transversal filter having both the desired cut-off of the filter of FIG. 5 and a limited stop-band rejection.
Figure 7:
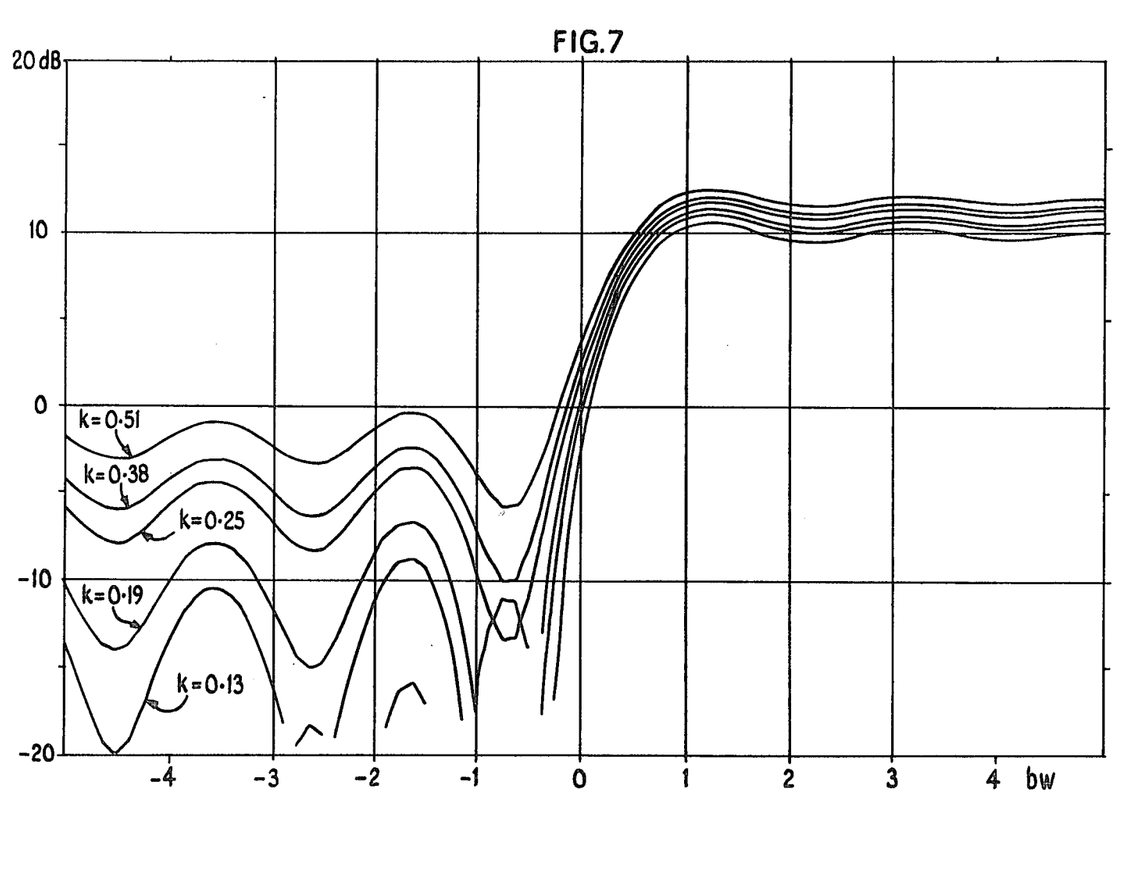
FIG. 7 illustrates typical filter responses as a function of k, which is a constant added to the filter coefficients to produce the desired limited stop-band rejection.

FIG. 4 shows how a conventional tapped delay line transversal filter can be used as a "sector" filter in the above applications. FIG. 4(a) depicts an idealized frequency response for a filter with 100% rectangular cut-off. FIG. 4(b) depicts the time response of a typical transversal filter configuration with a tapped delay line 10, the outputs from which are passed through weighting networks 11 before being summed in summing network 12 of FIG. 4(c). FIG. 4(c) itself illustrates the weighting of the networks 11 required to obtain the rectangular frequency response shown in FIG. 4(a). The basic filter shown in FIG. 4(c) in which the delay line has a total period T is suitable only if an output is required at a single point in the scan period (when the signal is fully held within the filter). However, if an output is required for 85% of the scan period (throughout which the signal is fully held by the filter), it is necessary to increase the filter's holding capacity, i.e. the delay period, accordingly, as shown in FIG. 4(d). The tap weightings required for a rectangular response for the filter of FIG. 4(d) are shown in FIG. 5. If λ=10 beamwidths, for example, and the weighting of the center tap is 1, then the taps on either side are respectively $2/\pi$, 0, $-2/3\pi$, 0, $2/5\pi$, 0, $-2/7\pi$ and so on. If the filter is required to have the limited stop-band rejection, as indicated by the dotted line in FIG. 3, then a constant k is added to the central tap coefficient, as shown in FIG. 6. FIG. 7 shows typical characteristics for a transversal filter having different values of k, ranging from k=0.13 to k=0.51, added to the central tap coefficient.

Figure 8:
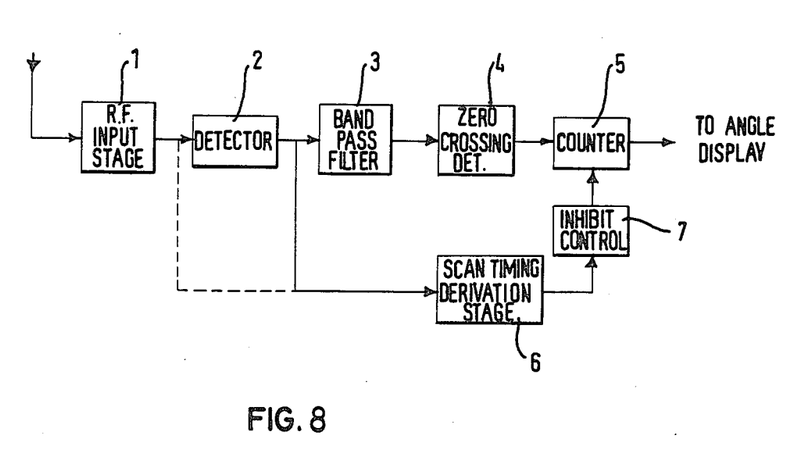
FIG. 8 is a circuit block diagram for implementing the invention.

FIG. 8 is an overall receiver circuit block diagram which is per se, the same as included in the aforementioned U.S. Pat. No. 3,946,386. The filter described herein in accordance with FIG. 4(d) is band-pass filter 3 in FIG. 8. In FIG. 8, the receiver also comprises an RF input stage 1, whereat signals received in accordance with the defined transmission format from an associated ground beacon are subjected to the necessary frequency conversion and amplification to be passed to detector stage 2, the output of which is the Doppler beat waveform.

After the detector 2, there is a bandpass filter 3 covering the expected range of useful Doppler beat frequencies, this being the FIG. 4(d) device. Here the direct path signal is passed and multipath signals are rejected or at least substantially attenuated. The next two stages 4 and 5 comprise a zero crossing detector 4 and a counter 5 to produce an output which is fed to any suitable readout, e.g., a center zero DC meter or other form of angle (elevation in the instance being described) information display.

In order to derive the bearing information within stages 4 and 5, it has been said to be necessary to control the time over which the period of the filtered signal is measured by the zero crossing detector 4 and the counter 5, this period being determined by the scan period.

The remaining stages in FIG. 8 include a scan timing derivation stage 6 having as its input either the Doppler beat waveform from the detector 2 or (alternatively) the output from the RF stage 1. From either of these signals, the instant of commencement of each scan may be determined, and a control stage 7 arranged to inhibit operation of the bearing signal count, i.e., to gate the signal in synchronism with the scan rate.

What is claimed is:

1. A radio navigation receiver for use in a Doppler radio navigation system having a ground beacon, transmission format with digitized scanning, said receiver including first means for deriving a Doppler beat information signal from signals transmitted by said ground beacon, comprising:

a wide band filter having a passband covering the range of Doppler beat frequencies corresponding to direct path signals from said ground beacon to said receiver;

second means for generating a control signal at the time of commencement of each scan cycle;

third means responsive to said beat information signal for determining the frequency of said Doppler signal during each scan;

fourth means responsive to said second means control signal for inhibiting operation of said third means at each scan commencement time for at least a part of the transient response time of said filter;

and a circuit constituting said filter as a tapped delay line transversal filter adapted for providing a frequency cut-off characteristic sufficient to discriminate between said direct signals and multipath signals when the separation of angles of arrival of said direct and multipath signals is at a predetermined operational minimum corresponding to a physical location of said receiver at the combination of a predetermined range and elevation above the ground.

2. Apparatus according to claim 1 in which said fourth means is adapted to inhibit said third means for approximately twenty-five percent of each scan cycle.

3. Apparatus according to claim 2 in which the stop-band rejection of said filter is limited to an attenuation substantially equal to that of said multipath signals compared to said direct signals when said angular separation of said angles of arrival of said direct and multipath signals is at said operational minimum.

4. Apparatus according to claim 1 in which the stop-band rejection of said filter is limited to an attenuation substantially equal to that of said multipath signals compared to said direct signals when said angular separation of said angles of arrival of said direct and multipath signals is at said operational minimum.

5. Apparatus according to claim 1 in which said filter includes sixth means for applying weighting coefficients to the signals at each tap of said tapped delay line, and in which seventh means are provided for summing the signals thereby weighted by said sixth means.

6. Apparatus according to claim 5 in which the the central tap of said delay line weighting coefficient is predetermined to be $1+k$ and the taps spaced therefrom on either side of said central tap are weighted by said sixth means in accordance with the coefficient series $2/\pi$, 0, $-2\pi/3$, 0, $2\pi/5$, 0 $-2\pi/7$, — working from said central tap outward on both sides.

* * * * *